US011436371B2

United States Patent
Beigi et al.

(10) Patent No.: US 11,436,371 B2
(45) Date of Patent: Sep. 6, 2022

(54) PRIVACY PROTECTION SYSTEMS AND METHODS

(71) Applicants: Ghazaleh Beigi, Tempe, AZ (US); Ruocheng Guo, Mianyang (CN); Huan Liu, Tempe, AZ (US); Yanchao Zhang, Phoenix, AZ (US); Alexander Nou, Mesa, AZ (US)

(72) Inventors: Ghazaleh Beigi, Tempe, AZ (US); Ruocheng Guo, Mianyang (CN); Huan Liu, Tempe, AZ (US); Yanchao Zhang, Phoenix, AZ (US); Alexander Nou, Mesa, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 305 days.

(21) Appl. No.: 16/782,349

(22) Filed: Feb. 5, 2020

(65) Prior Publication Data
US 2021/0279369 A1 Sep. 9, 2021

Related U.S. Application Data

(60) Provisional application No. 62/801,773, filed on Feb. 6, 2019.

(51) Int. Cl.
*G06F 21/52* (2013.01)
*G06F 21/62* (2013.01)
(Continued)

(52) U.S. Cl.
CPC ...... *G06F 21/6263* (2013.01); *G06F 16/9536* (2019.01); *G06F 16/9558* (2019.01)

(58) Field of Classification Search
CPC ............. G06F 21/6263; G06F 21/6245; G06F 21/6227; G06F 16/9558; G06F 16/9536; G06F 17/11
See application file for complete search history.

(56) References Cited

U.S. PATENT DOCUMENTS

| 9,544,381 B2 | 1/2017 | Zafarani et al. |
| 10,664,764 B2 | 5/2020 | Gundecha et al. |

(Continued)

FOREIGN PATENT DOCUMENTS

| WO | 2020061578 A1 | 3/2020 |

OTHER PUBLICATIONS

Michaela Gotz et al., Non-Patent Literature, Publishing Search Logs—A Comparative Study of Privacy Guarantees, Mar. 2012, pp. 520-530 (Year: 2012).*

(Continued)

*Primary Examiner* — Alexander Lagor
*Assistant Examiner* — William B Jones
(74) *Attorney, Agent, or Firm* — Snell & Wilmer L.L.P.

(57) ABSTRACT

Systems and methods of privacy protection of a user may include compiling an actual number of links in a web history corresponding to each topic in a plurality of internet topics; compiling a topic probability distribution based on the web history; determining an additional number of links to be added to each topic in the plurality of internet topics; and modifying the topic probability distribution by selecting a set of links corresponding to the additional number of links for each topic in the plurality of internet topics.

14 Claims, 4 Drawing Sheets

(51) Int. Cl.
  *G06F 16/955* (2019.01)
  *G06F 16/9536* (2019.01)

(56) References Cited

U.S. PATENT DOCUMENTS

| | | | | |
|---|---|---|---|---|
| 2014/0075004 | A1* | 3/2014 | Van Dusen | H04L 41/04 709/223 |
| 2017/0212943 | A1 | 7/2017 | Li et al. | |
| 2017/0213153 | A1 | 7/2017 | Wang et al. | |
| 2019/0379628 | A1 | 12/2019 | Wu et al. | |
| 2020/0019840 | A1 | 1/2020 | Guo et al. | |
| 2020/0065292 | A1 | 2/2020 | Li et al. | |

OTHER PUBLICATIONS

Gervais A, Shokri et al., Non-Patent Literature, Quantifying web-search privacy, Nov. 3, 2014, ACM, pp. 966-970 (Year: 2014).*
Alvari, H., Shaabani, E. & Shakarian, P. (2018). Early Identification of Pathogenic Social Media Accounts. In IEEE Intelligence and Security Informatics (ISI). IEEE.
Alvari, H., Shakarian, P., & Snyder, K. JE. (2017) Semi-supervised learning for detecting human trafficking. Security Informatics vol. 6, Article No. 1 (2017), 1.
Balsa, E., Troncoso, C. & Diaz, C. (2012) OB-PWS: Obfuscation-based private web search. In Security and Privacy (SP), 2012 IEEE Symposium on. IEEE, pp. 491-505.
Beigi, G. & Liu, H. (2018). Privacy in Social Media: Identification,Mitigation and Applications. Web, vol. 9. No. 4, Article 39 (2018). ACM Trans.
Beigi, G. & Liu, H. (2018). Similar but Different: Exploiting Users' Congruity for Recommendation Systems. In International Conference on Social Computing, Behavioral-Cultural Modeling, and Prediction. Springer.
Beigi, G., Shu, K., Zhang Y., & Liu, H. (2018). Securing Social Media User Data: An Adversarial Approach. In Proceedings of the 29th on Hypertext and Social Media ACM, pp. 165-173.
Beigi, G., Tang J., Wang S., & Liu, H. (2016). Exploiting emotional information for trust/distrust prediction. In Proceedings of the 2016 SIAM international conference on data mining. SIAM, pp. 81-89.
Blei, D.M., Ng, A.Y., & Jordan, M.I. (2003). Latent dirichlet allocation. Journal of machine Learning research 3, Jan. 2003, pp. 993-1022.
Castellà-Roca, J., Viejo, A. & Herrera-Joancomartí, J. (2009). Preserving userâĂŹs privacy in web search engines. Computer Communications vol. 32, Article No. 13 (2009), pp. 1541-1551.
Christin,N., Yanagihara, S. S. & Kamataki, K. (2010). Dissecting one click frauds. In Proceedings of ACM conference in Computer and communications security.
Cooper, A. (2008). A survey of query log privacy-enhancing techniques from a policy perspective. ACM Transactions in the Web (TWEB) vol. 2, Issue 4, Article No. 19 (2008).
Englehardt, S. & Narayanan, A. (2016). Online tracking: A 1-millionsite measurement and analysis. In ACM SIGSAC Conference on Computer and Communications Security, pp. 1388-1401.
Feige, U., Mirrokni, V. S. & Vondrak, J. (2011). Maximizing non-monotone submodular functions. SIAM J. Comput. vol 40, Article No. 4 (2011), pp. 1133-1153.
Gervais, A., Shokri, R., Singla, A., Capkun, S. & Lenders, V. (2014) Quantifying web-search privacy. In Proceedings of the 2014 ACM SIGSAC Conference on Computer and Communications Security. ACM, pp. 966-977.
Gotz, M., Machanavajjhala, A., Wang, G., Xiao, X. & Gehrke, J. (2012). Publishing search logsâĂŤa comparative study of privacy guarantees. IEEE Transactions on Knowledge and Data Engineering vol. 24, Article No. 3 (2012), pp. 520-532.
Guerraoui, R., Kermarrec, A. & Taziki, M. (2017). The Utility and Privacy Effects of a Click. In Proceedings of ACM.
Howe, D.C & Nissenbaum, H. (2009). TrackMeNot: Resisting surveillance in web search. Lessons from the Identity trail: Anonymity, privacy, and identity in a networked society vol. 23 (2009), pp. 417-436.
Hua, J., Xia C., & Zhong, S. (2015). Differentially Private Matrix Factorization. In IJCAI. pp. 1763-1770.
Krause, A. & Horvitz, E. (2010). A utility-theoretic approach to privacy in online services. Journal of Artificial Intelligence Research vol. 39 (2010), pp. 633-662.
Krause, A., Singh, A., & Guestrin, C. (2008). Near-optimal sensor placements in Gaussian processes: Theory, efficient algorithms and empirical studies. Journal of Machine Learning Research vol. 9, Feb. 2008, pp. 235-284.
Lerner, A., Simpson, A.K., Kohno, T. & Roesner, F. (2016). Internet Jones and the Raiders of the Lost Trackers: An Archaeological Study of Web Tracking from 1996 to 2016. In USENIX Security Symposium.
Li, L., Wang, D., Li, T., Knox, D., & Padmanabhan, B. (2011). SCENE: a scalable two-stage personalized news recommendation system. In Proceedings ACM SIGIR.
Machanavajjhala, A., Korolova, A., & Sarma, A.D. (2011). Personalized social recommendations: accurate or private. Proceedings of the VLDB Endowment (2011).
McPherson, M., Smith-Lovin, L., & Cook, J.M. (2001). Birds of a feather: Homophily in social networks. Annual review of sociology vol. 27, Article No. 1 (2001), pp. 415-444.
McSherry, F. & Mironov, I. (2009). Differentially private recommender systems: building privacy into the net. In Proceedings of SIGKDD. ACM.
Meng. W., Lee, B., Xing, X., & Lee, W. (2016). TrackMeOrNot: Enabling Flexible Control on Web Tracking. In Proceedings of the 25th WWW. pp. 99-109.
Narayanan, A. & Shmatikov, V. (2009). De-anonymizing social networks. In Security and Privacy, 2009 30th IEEE Symposium on. IEEE, pp. 173-187.
Nemhauser, G.L., Wolsey, A.L., & Fisher, M.L. (1978). An analysis of approximations for maximizing submodular set functionsâĂŤI. Mathematical Programming vol. 14, Article No. 1 (1978), pp. 265-294.
Phuong, T. M. et al. (2014). Gender prediction using browsing history. In Knowledge and Systems Engineering.
Rehurek, R. & Sojka, P. (2010). Software framework for topic modelling with large corpora. In In Proceedings of the LREC 2010 Workshop on New Challenges for NLP Frameworks. Citeseer.
Sarwar, B. M., Karypis G., Konstan,J., & Riedl, J. (2002). Recommender systems for large-scale e-commerce: Scalable neighborhood formation using clustering. In International conference on computer and information technology.
Shen, Y. & Jin, H. (2014). Privacy-preserving personalized recommendation: An instance-based approach via differential privacy. In Proceedings of ICDM.IEEE.
Shen, Y. & Jin, H. (2016). EpicRec: towards practical differentially private framework for personalized recommendation. In Proceedings of ACM SIGSAC. ACM.
Singla, A., Horvitz, E., Kamar, E., & White, R. (2014). Stochastic privacy. In AAAI. pp. 152-158.
Su, J., Sharma, A., & Goel, S. (2016). The effect of recommendations on network structure. In Proceedings of WWW.
Su, J., Shukla, A., Goel, S., & Narayanan, A. (2017). Deanonymizing web browsing data with social networks. In Proceedings of the 26th International Conference on World Wide Web. pp. 1261-1269.
Ungar, L.H. & Foster, D.P., (1998). Clustering methods for collaborative filtering. In AAAI workshop on recommendation systems, vol. 1. pp. 114-129.
Yang, H., Soboroff, I., Xiong, L., Clarke, C. LA , & Garfinkel, S.L. (2016). Privacy-Preserving IR 2016: Differential Privacy, Search, and Social Media. In ACM SIGIR.
Ye, S., Wu, F., Pandey, R., & Chen, H. (2009). Noise injection for search privacy protection. In Computational Science and Engineering, vol. 3. IEEE, pp. 1-8.

(56) References Cited

OTHER PUBLICATIONS

Zhang, S., Yang, H. & Singh, L. (2016). Anonymizing query logs by differential privacy. In Proceedings of the 39th International ACM SIGIR conference on Research and Development in Information Retrieval. ACM, pp. 753-756.

Zhu, Y., Xiong, L., & Verdery, C. (2010). Anonymizing user profiles for personalized web search. In WWW. ACM.

Zimmeck, S., Li, J.S., Kim, H., Bellovin,S.M., & Jebara, T. (2017). A privacy analysis of cross-device tracking. In 26th Security Symposium USENIX, pp. 1391-1408.

U.S. Appl. No. 16/525,148, filed Jul. 29, 2019, Shu et al.
U.S. Appl. No. 17/018,877, filed Sep. 11, 2020, Shu et al.

* cited by examiner

PRIVACY PROTECTION SYSTEMS AND METHODS

CROSS-REFERENCE TO RELATED APPLICATIONS

This application is a non-provisional of, and claims priority to and the benefit of, U.S. Provisional Application No. 62/801,773, titled "Web Anonymization Systems and Methods," filed on Feb. 6, 2019, which is hereby incorporated by reference in its entirety.

FEDERALLY SPONSORED RESEARCH OR DEVELOPMENT

This invention was made with government support under contract No. 1614576 awarded by the National Science Foundation, under contract No. W911NF-15-1-0328 awarded by the Army Research Office, and under contract No. N00014-17-1-2605 awarded by the Office of Naval Research. The government has certain rights in the invention.

TECHNICAL FIELD

The present disclosure relates to user privacy protection, and in particular to modification of a user's web browser history.

BACKGROUND

The overturning of the Internet Privacy Rules by the Federal Communications Commission reduces a user's privacy and security by allowing the collection and sharing of user's web browsing data. Current security and privacy protection systems may allow users to conceal their web browsing data, but suffer from various drawbacks, including hampered web services and degraded speed of various sites and applications. Accordingly, improved web user security and privacy protection systems are desirable.

SUMMARY

A method of increasing privacy of a web user is disclosed herein. The method may comprise: (a) generating, by a processor, a plurality of internet topics; (b) determining, by the processor, a first number of links to add to a first topic in the plurality of internet topics; (c) repeating step (b) for each internet topic from the plurality of internet topics until a number of links is determined for each internet topic of the plurality of internet topics; (d) selecting, by the processor, a first plurality of links corresponding in number to the first number of links and corresponding in topic to the first topic; and (e) repeating step (d) for each internet topic from the plurality of internet topics until a plurality of links are selected for each internet topic from the plurality of internet topics that corresponds in number to the number of links determined for each internet topic in step (c).

In various embodiments, the method of increasing privacy of the web user further comprises balancing, by the processor, a privacy number of links to add for each internet topic to create a uniform distribution of a browser history with an amount of utility loss from the privacy number of links to add for each internet topic to determine the number of links for each internet topic. The method of increasing privacy of the web user may further comprise balancing the number of links is based on a tradeoff coefficient that sets a prioritization of privacy compared to utility loss. Selecting the first plurality of links may further comprise selecting the first plurality of links from a random user outside of a friends list on a social media platform. Selecting the first plurality of links may further comprise selecting the first plurality of links from a random internet user. The method of increasing privacy of the web user may further comprise receiving, by the processor, a topic frequency vector based on a web browsing history. The method of increasing privacy of the web user may further comprise generating, by the processor, a modified topic frequency vector based on the plurality of links selected for each internet topic.

A computer-based privacy system is disclosed herein. The computer based privacy system may comprise: a processor; and a tangible, non-transitory memory configured to communicate with the processor, the tangible, non-transitory memory having instructions stored thereon that, in response to execution by the processor, cause the processor to perform operations comprising: (a) generating, by a processor, a plurality of internet topics; (b) determining, by the processor, a first number of links to add to a first topic in the plurality of internet topics; (c) repeating step (b) for each internet topic from the plurality of internet topics until a number of links is determined for each internet topic of the plurality of internet topics; (d) selecting, by the processor, a first plurality of links corresponding in number to the first number of links and corresponding in topic to the first topic; and (e) repeating step (d) for each internet topic from the plurality of internet topics until a plurality of links are selected for each internet topic from the plurality of internet topics that corresponds in number to the number of links determined for each internet topic in step (c).

A method of increasing privacy of a web user is disclosed herein. The method may comprise: compiling an actual number of links in a web history corresponding to each topic in a plurality of internet topics; compiling a topic probability distribution based on the web history; determining an additional number of links to be added to each topic in the plurality of internet topics; and modifying the topic probability distribution by selecting a set of links corresponding to the additional number of links for each topic in the plurality of internet topics.

In various embodiments, the topic probability distribution may be configured to measure a browsing distribution of a web user's browsing across the plurality of internet topics. Determining the additional number of links may be determined by balancing a privacy level obtained by adding the additional number of links with a utility loss created by adding the additional number of links. Balancing the additional number of links may be based on a tradeoff coefficient that sets a prioritization of privacy compared to the utility loss. Modifying the topic probability distribution may further comprise selecting the set of links from a random user outside of a friends list on a social media platform. Modifying the topic probability distribution may further comprise selecting the set of links from a random user.

The contents of this summary section are intended as a simplified overview of the disclosure and are not intended to be used to limit the scope of any claim.

BRIEF DESCRIPTION OF THE DRAWINGS

With reference to the following description and accompanying drawings.

DETAILED DESCRIPTION

Figure 1:
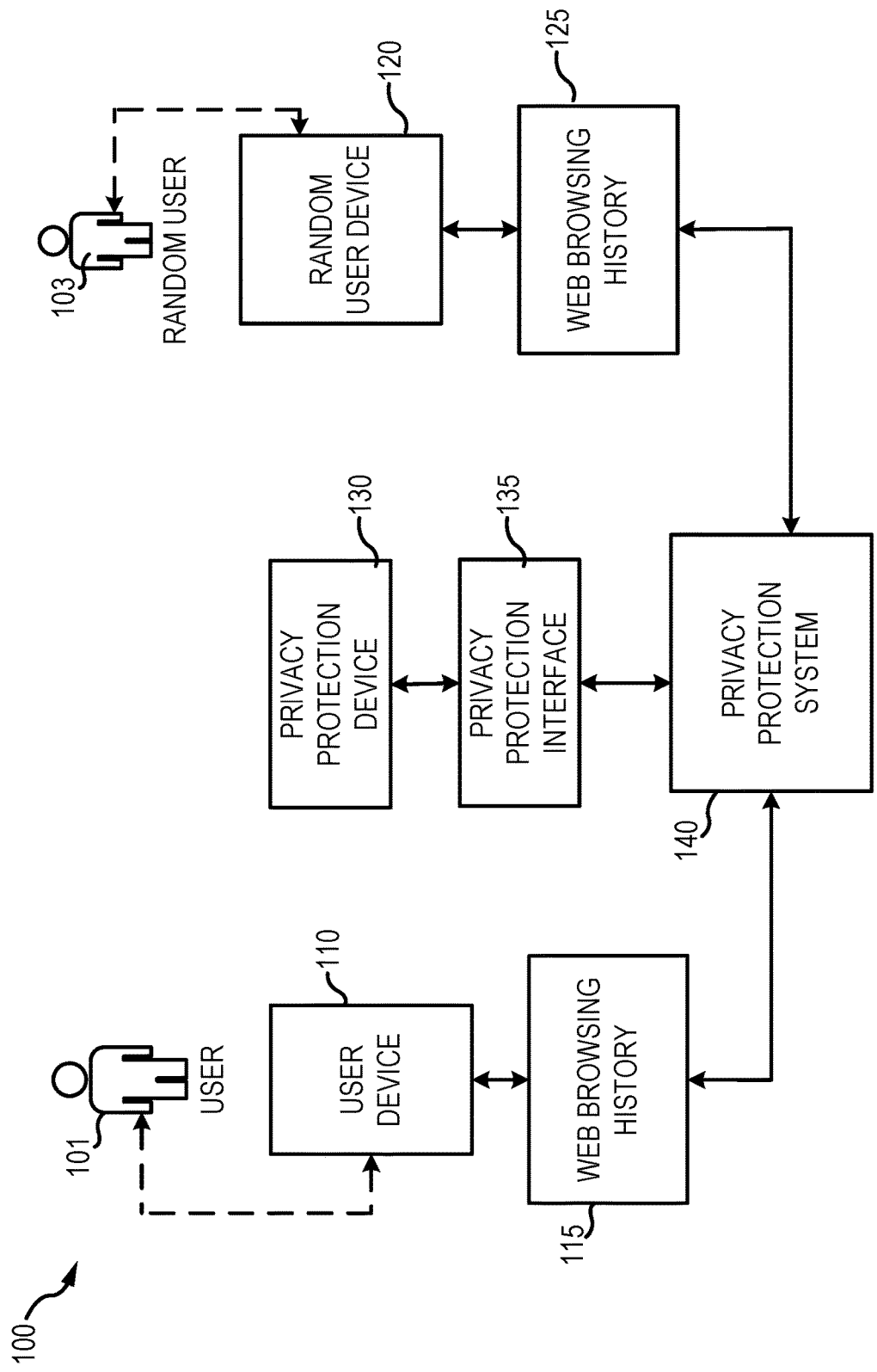
FIG. 1 illustrates a computer-based privacy protection system, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used herein, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Principles of the present disclosure contemplate the use of a computer-based privacy system comprising determining a number of links for various internet topics and modifying a user's browser history by selecting links from the various internet topics. Prior approaches for modification of user's web browsing history, for example, are Tor, VPN, and HTTPS. These user protection systems result in degraded utility for a user and hampered personalized services online. For example, by anonymizing web history, as discussed herein, the system may balance a decrease in predictability of a user's online activity, while minimizing the processing power loss to the system from decreasing a user's web history predictability.

Referring now to FIGS. 1-4, the process flows depicted are merely embodiments and are not intended to limit the scope of the disclosure. For example, the steps recited in any of the method or process descriptions may be executed in any suitable order and are not limited to the order presented. It will be appreciated that the following description makes appropriate references not only to the steps and user interface elements depicted in FIGS. 1-4, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on, a processing apparatus executing upgraded software, a stand-alone system, a distributed system, a method, a data processing system, a device for data processing, and/or a computer program. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program on a computer-readable storage medium having computer-readable program code means embodied in the storage medium. Any suitable computer-readable storage medium may be utilized, including solid state storage, optical storage devices, magnetic storage devices, and/or the like.

In various embodiments, components, modules, and/or engines of system 100 may be implemented as microapplications or micro-apps. Micro-apps are typically deployed in the context of a mobile operating system, including for example, Android, iOS, Windows Mobile, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Exemplary systems and methods may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, and the like, which may carry out a variety of functions under the control of one or more microprocessors or other control devices. Similarly, the software elements of the system may be implemented with any programming or scripting language such as C, C++, C#, JAVA, JAVASCRIPT, JAVASCRIPT Object Notation (JSON), VBScript, Macromedia COLD FUSION, COBOL, MICROSOFT company's Active Server Pages, assembly, PERL, PHP, PYTHON, Visual Basic, SQL Stored Procedures, PL/SQL, or any UNIX shell script with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent use issues with a client-side scripting language, such as JAVASCRIPT, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Exemplary systems and methods may be described herein with reference to screen shots, block diagrams and flowchart illustrations of methods, apparatus, and computer program according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In various embodiments, the software elements of the system may also be implemented using NODE.JS components. NODE.JS programs may implement several modules to handle various core functionalities. For example, a package management module, such as NPM, may be implemented as an open source library to aid in organizing the installation and management of third-party NODE.JS programs. NODE.JS programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system or methods associated therewith.

In various embodiments, and with reference to FIG. 1, a system 100 for privacy protection of a user's web browser history is disclosed (e.g., a user privacy protection system). System 100 may allow the addition of links to a web browser of a user 101 (e.g., an internet user). System 100 may comprise one or more of a user device 110, a first web browsing history 115, a random user device 120, a second web browsing history 125, and a privacy protection system 140. System 100 may be utilized by any user utilizing the internet. Although privacy protection system 140 is described throughout as a server, it may be installed as computer software on a user's computer in any manner known in the art.

In various embodiments, user 101 may desire privacy protection of web browsing history in order to increase user privacy. For example, user 101 may visit several websites over a given time period. These websites may generate a first web browsing history 115 for user 101. Similarly, a random user 103 may generate a second web browsing history 125 by visiting various websites on a random user device 120. Privacy protection system 140 may take links from the second web browsing history 125 and add these links to the first web browsing history 115.

Privacy protection device 130 may be in electronic communication with privacy protection interface 135. Privacy protection interface 135 may comprise software, a mobile application, a web interface, or the like accessible from privacy protection device 130. For example, privacy protection interface 135 may include a user interface, software modules, logic engines, various databases, interfaces to systems and tools, and/or computer networks. Privacy protection interface 135 may be in electronic communication with privacy protection system 140. For example, privacy protection interface 135 may allow inputs to privacy protection system 140 via privacy protection device 130, as discussed further herein. Access to privacy protection interface 135 may be controlled by the authorization via credentials or the like. For example, privacy protection interface 135 may be accessed by inputting credentials (e.g., an identification, a password, a biometric input, etc.). In relation to the software application of this disclosure, privacy protection interface 135 may provide updates to the process/system through update packages sent out to current users in any manner known in the art.

In various embodiments, privacy protection device 130 may comprise various hardware, software, and/or database components configured to enable privacy protection device 130 to participate in system 100 and provide inputs to privacy protection system 140. For example, privacy protection device 130 may be computer based privacy system, and may comprise a processor, a tangible non-transitory computer-readable memory, and/or a network interface, along with other suitable system software and hardware components. Instructions stored on the tangible non-transitory memory may allow privacy protection device 130 to perform various functions, as described herein. The processor may include any logic device such as one or more of a central processing unit (CPU), an accelerated processing unit (APU), a digital signal processor (DSP), a field programmable gate array (FPGA), an application specific integrated circuit (ASIC), or the like.

Similarly, in various embodiments, user devices (110, 120) may comprise various hardware, software, and/or database components configured to enable user device 110 to participate in system 100 and initiate and obtain enhanced user privacy protection. For example, user devices (110, 120) may be computer based, and may comprise a processor, a tangible non-transitory computer-readable memory, and/or a network interface, along with other suitable system software and hardware components. Instructions stored on the tangible non-transitory memory may allow user devices (110, 120) to perform various functions, as described herein. The processor may include any logic device such as one or more of a central processing unit (CPU), an accelerated processing unit (APU), a digital signal processor (DSP), a field programmable gate array (FPGA), an application specific integrated circuit (ASIC), or the like.

In accordance with various embodiments, privacy protection system 140 may be configured to perform various operations for enhancing a user's privacy, such as, for example, determining a number of web links needed to add to a user's web history for enhanced privacy and adding various web links to a user's web history, as discussed further herein. Privacy protection system 140 may be in electronic communication with privacy protection interface 135 and/or privacy protection device 130. Privacy protection system 140 may comprise any suitable combination of hardware, software, and/or database components, including, for example, a server, web server, pooled servers, or the like. Privacy protection system 140 may also include one or more data centers, cloud storages, network environments, or the like. In various embodiments, privacy protection system 140 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein. The processor may include any logic device such as one or more of a central processing unit (CPU), an accelerated processing unit (APU), a digital signal processor (DSP), a field programmable gate array (FPGA), an application specific integrated circuit (ASIC), or the like.

Figure 2:
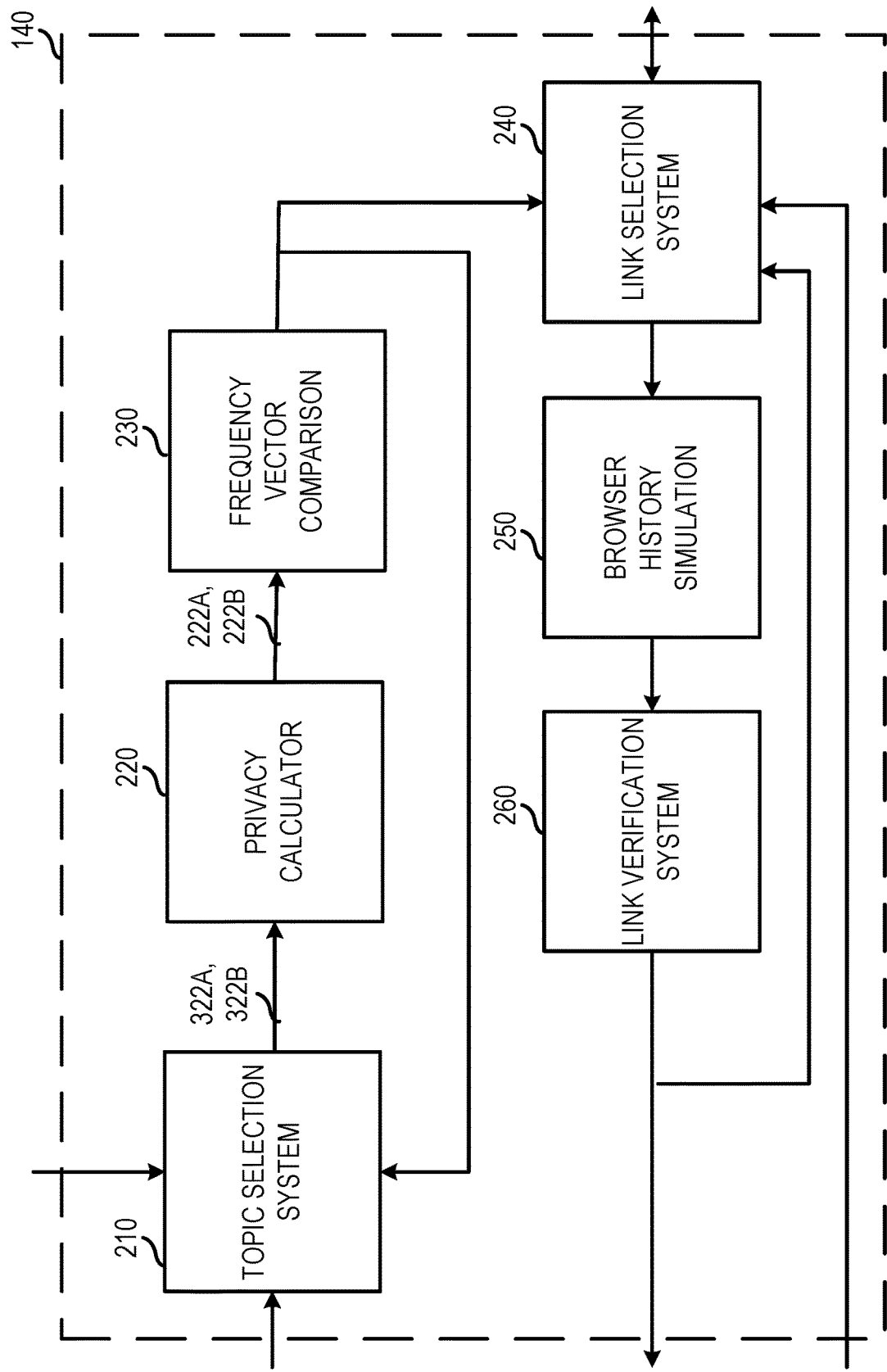
FIG. 2 illustrates a privacy protection system, in accordance with various embodiments.
Figure 3:
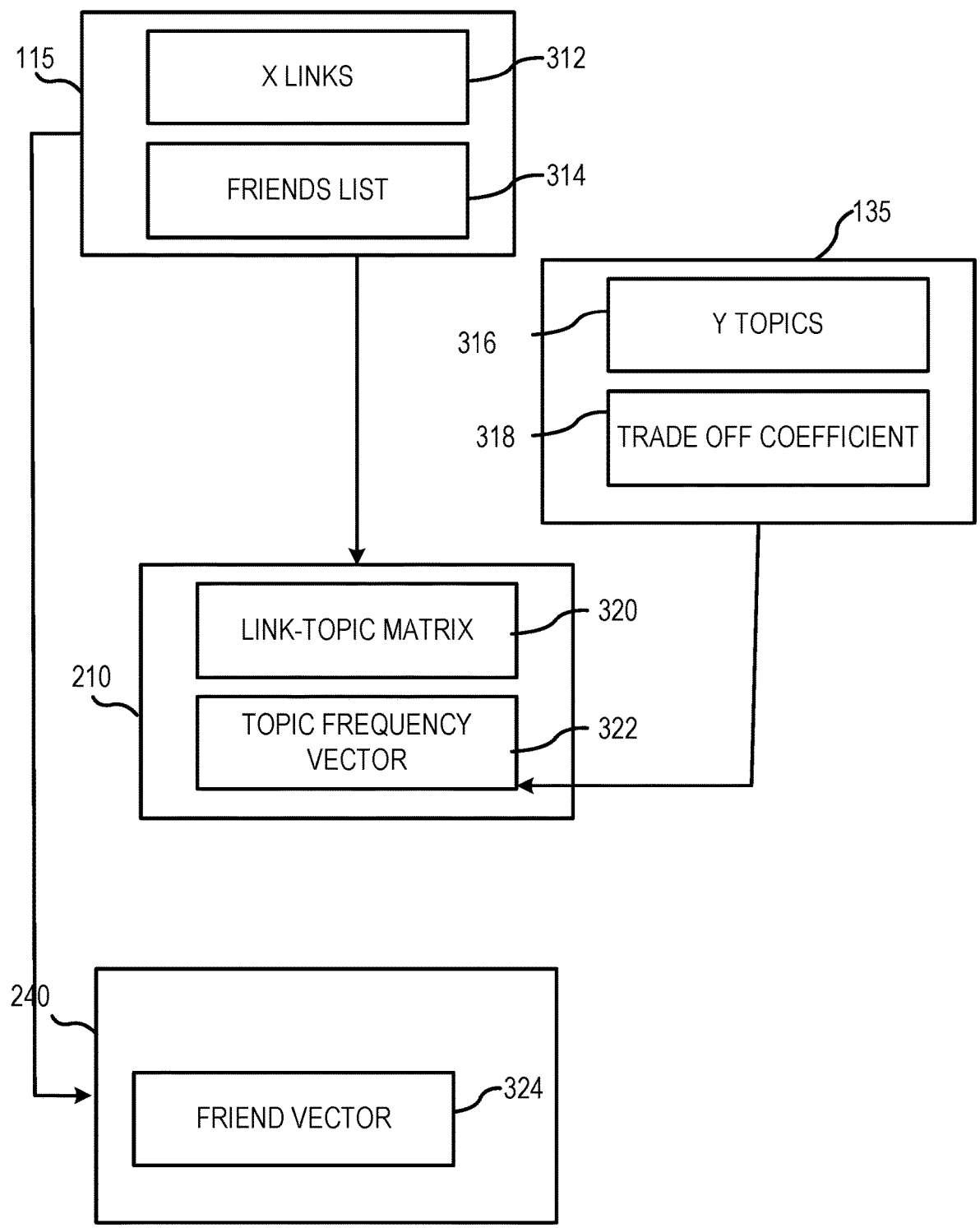
FIG. 3 illustrates communication between a web browsing history, a privacy protection system, and a privacy protection interface, in accordance with various embodiments.

As a further example, and with reference to FIG. 2, a privacy protection system 140, in accordance with various embodiments, is depicted. A privacy protection system 140 may comprise a topic selection system 210, a privacy calculator 220, a frequency vector comparison module 230, a link selection system 240, a browser history simulation 250, and a link verification system 260. Referring now to FIGS. 1 and 2, topic selection system 210 may receive inputs from privacy protection interface 135 and first web browsing history 115. With brief reference to FIG. 3, first web browsing history 115 may comprise X links selected by a user 312 and a friend's list 314 having a list of all users who are friends with user 101 on social media or the like, that may be provided as inputs into topic selection system 210. Similarly, privacy protection interface 135 may have inputs of Y topics 316 and a tradeoff coefficient input 318. Y topics 316 may correspond to a finite number of internet topics, where generally all links selectable on the internet correspond to a topic within the finite number of topics (Y topics 316). It will be appreciated a trade-off coefficient, lambda, controls the effect of privacy components of an exemplary system. Stated another way, the higher the value of lambda, the greater the effect of the privacy component. In these situations the model is focused more on maximizing privacy rather than utility. Moreover, in order to increase the privacy, topics are desirably selected such that they make the user's profile more ambiguous. This results in selecting a wider variety of topics that are different from the user's actual topics of interest. As this is in contrast with the goal of minimizing utility loss, it will be appreciated that to minimize the utility loss, topics may desirably be selected which are close to the user's interests; these two goals are in tension. The tradeoff coefficient input 318 controls the amount of effect of the privacy portion.

The inputs provided by privacy protection interface 135 and first web browsing history 115 may be utilized by topic selection system 210 to generate a link-topic matrix 320 having a matrix of X topics by Y links, and a topic frequency vector 322 based on the number of links in each topic of the link-topic matrix 320. The topic frequency vector 322 may predict the likelihood a user 101 selects a link in a certain topic.

Referring back to FIG. 2, the topic selection may take the inputs and output a modified topic frequency vector 322A having the original topic frequency vector with the addition of an element vector corresponding in length to modified topic frequency vector 322A. The modified topic frequency vector is input into privacy calculator 220. The privacy calculator 220 calculates the level of privacy the modified topic frequency vector 322A achieves. The privacy calculator 220 outputs a value for privacy 222A that is achieved by modified topic frequency vector 322A.

The process is then repeated with another modified topic frequency vector 322B. After the process is repeated, frequency vector comparison module 230 compares the first value for privacy 222A with the second value for privacy 222B. If the first value for privacy 222A is greater than the second value of privacy 222B, modified topic frequency vector 322A is input into link selection system 240. If the second value for privacy 222B is greater, the process is repeated until the first value for privacy is greater than the second value for privacy. This ensures that the value of privacy is maximized. Additionally, in addition to the foregoing description of updating privacy, in some exemplary embodiments, (1) privacy, and (2) utility loss are calculated, and thereafter the objective function G may be calculated, which is a function of lambda, privacy, and utility loss (e.g., Objective function G may be equal to lambda×privacy−utility loss). Thereafter, the process is repeated for new topic frequency, and if the value of G increased, an exemplary method updates the topic frequency and G value.

Referring back to FIG. 3, the friends list 314 from the first web browsing history 115 may be provided as an input into link selection system 240 and a friend vector 324 is created. Referring now to FIGS. 1 and 2, link selection system may take the friend vector 324 and select a random user 103 from all web users excluding friend vector 324. Then, for each update to a topic, link selection system 240 may select a random user from outside the friend group of users 101. Selecting based on this criterion may result in a greater likelihood that the user prefers different topics. Based on the second web browsing history 125 of random user 103, a browser history simulation 250 may be performed. The browser history simulation 250 may generate a link-topic matrix and output the link-topic matrix to the link verification system 260. The link verification system 260 may determine if there is a link in the topic to be updated. If there is no link in the topic being updated, the process will be repeated for that topic. If there is a link in the topic to be updated, the link will be added to first web browsing history 115, and the process will be repeated until every additional link, determined from the modified vector output from the frequency vector comparison module 230, for every topic that needs additional links is added to first web browsing history 115.

Figure 4:
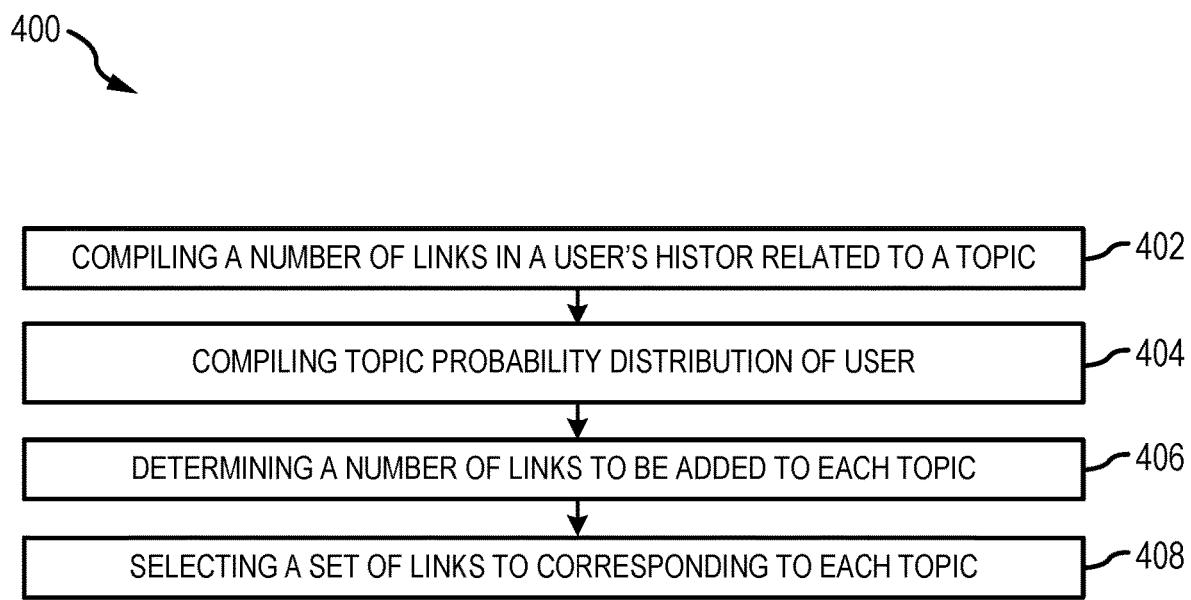
FIG. 4 illustrates a method of increasing privacy of a web user, in accordance with various embodiments.

With reference now to FIG. 4, a method of increasing privacy of a web user 400 may comprise compiling a number of links in a user's history related to a plurality of topics (step 402), compiling a topic probability distribution of a user (step 404), determining a number of links to be added to each topic (step 406), and selecting a set of links corresponding to each topic (step 408). The step 402 may include an input of a finite number of topics where every link on the internet may correspond to a topic from the finite number of topics. Once the number of topics is determined, the computer-based privacy system may perform step 402 by compiling data relating to how many links a user selects in each topic of the finite number of topics.

Referring to the topic probability distribution from step 404, if a user selects an equal number of links in every topic, the user would experience the greatest amount of privacy. From the compiled number of links related to each topic from step 402, the method may compile a topic probability distribution configured to measure the spread of the user's interests across the different topics. The higher the probability distribution, the higher the user privacy. Similarly, referring to step 408, if a number of links are added to each topic creating an equal number of links for each topic, the modified topic probability distribution would provide a user with the greatest amount of privacy. Yet, the more links that are added to create the modified topic probability distribution, the greater the utility loss of the system.

In step 406, the method of increasing privacy of a web user 400 may determine a number of links to be added to each topic. This number of links may be determined by balancing the privacy level obtained by adding the number of links with the utility loss created by adding a greater number of links. This balance can be obtained by selecting a tradeoff coefficient that sets the prioritization of user privacy vs. utility loss. The tradeoff coefficient may be pre-determined and set based on prior experimentation. The higher the tradeoff coefficient is set at, the greater amount of utility loss the method for enhancing user privacy 400 may allow.

In step 408, for each link selected, the method of increasing privacy of a web user 400 may select a user of social media and generate a topic relation matrix from the random user corresponding to the random user's web history. If a link corresponds to the topic being selected, the link may be selected. If no link corresponds to the topic being selected, a new random user may be chosen, and the process may be repeated.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, other advantages, and solutions to problems have been described above with regard to various embodiments. However, advantages and solutions to problems, and any element(s) that may cause any advantages or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method of increasing privacy of a web user, the method comprising:
   receiving, from a privacy protection device configured to provide data including a tradeoff coefficient indicating a level of tradeoff between privacy and utility related to information included in a web browsing history;
   a. generating, by a processor, a plurality of internet topics included in a web browsing history of the web user;
   b. determining, by the processor, a number of links related to an internet topic of the plurality of internet topics to add to the web browsing history of the web user;
   c. repeating step (b) for each internet topic of the plurality of internet topics until the number of links is determined for the each internet topic of the plurality of internet topics;

d. obtaining, by the processor, a plurality of links corresponding in number to the respective number of links and corresponding in topic to the respective internet topic to add to the web browsing history of the web user; and e. repeating step (d) for the each internet topic of the plurality of internet topics until the plurality of links are obtained for the each internet topic of the plurality of internet topics, the plurality of links corresponding in number to the respective number of links determined for the each internet topic in step (c);

wherein the determining of the number of links is based on the tradeoff coefficient and includes determining, based on the tradeoff coefficient, a first number and a second number different from the first number as the numbers of links for, respectively, a first internet topic and a second internet topic of the plurality of internet topics.

2. The method of claim 1, further comprising determining the number of links to add for the each internet topic by balancing, by the processor, (i) a level of privacy to be achieved based on the respective numbers of links to add for the plurality of internet topics to create a particular distribution of numbers of links for the plurality of internet topics within an updated web browsing history including the respective number of links added for the each internet topic with (ii) an amount of utility loss from the number of links to add for the each internet topic.

3. The method of claim 2, wherein balancing the level of privacy to be achieved with the amount of utility loss is based on the tradeoff coefficient that sets a prioritization level of privacy compared to utility loss.

4. The method of claim 1, wherein obtaining the plurality of links comprises receiving data related to the plurality of links from a device associated with a random user outside of a friends list of the web user on a social media platform.

5. The method of claim 1, wherein obtaining the plurality of links comprises receiving data related to the plurality of links from a device associated with a random internet user.

6. The method of claim 1, further comprising receiving, by the processor, a topic frequency vector based on the web browsing history of the web user.

7. The method of claim 6, further comprising generating, by the processor, a modified topic frequency vector based on the plurality of links obtained for the each internet topic.

8. A computer-based privacy system, comprising: a processor; and a tangible, non-transitory memory configured to communicate with the processor, the tangible, non-transitory memory having instructions stored thereon that, in response to execution by the processor, cause the processor to perform operations comprising:

receiving, from a privacy protection device configured to provide data including a plurality of internet topics and a tradeoff coefficient indicating a level of tradeoff between privacy and utility related to information included in a web browsing history;

a. identifying, by the processor, the plurality of internet topics included in a web browsing history of a web user;

b. determining, by the processor, a number of links related to an internet topic of the plurality of internet topics to add to the web browsing history of the web user;

c. repeating step (b) for each internet topic of the plurality of internet topics until the number of links is determined for the each internet topic of the plurality of internet topics;

d. selecting obtaining, by the processor, a plurality of links corresponding in number to the respective number of links and corresponding in topic to the respective internet topic to add to the web browsing history of the web user; and e. repeating step (d) for the each internet topic of the plurality of internet topics until the plurality of links are obtained for the each internet topic of the plurality of internet topics, that correspond the plurality of links corresponding in number to the respective number of links determined for the each internet topic in step (c);

wherein the determining of the number of links is based on the tradeoff coefficient and includes determining, based on the tradeoff coefficient, a first number and a second number as the numbers of links for, respectively, a first internet topic and a second internet topic of the plurality of internet topics.

9. The system of claim 8, wherein the operations further comprise determining the number of links to add for the each internet topic by balancing, by the processor, (i) a level of privacy to be achieved based on the respective numbers of links to add for the plurality of internet topics to create a particular distribution of numbers of links for the plurality of internet topics within an updated web browsing history including the respective number of links added for the each internet topic with (ii) an amount of utility loss from the number of links to add for the each internet topic.

10. The system of claim 9, wherein balancing the level of privacy to be achieved with the amount of utility loss is based on the tradeoff coefficient that sets a prioritization level of privacy compared to utility loss.

11. The system of claim 8, wherein obtaining the plurality of links comprises receiving data related to the plurality of links from a device associated with a random user outside of a friends list of the web user on a social media platform.

12. The system of claim 8, wherein obtaining the plurality of links comprises receiving data related to the plurality of links from a device associated with a random internet user.

13. The system of claim 8, wherein the operations further comprise receiving, by the processor, a topic frequency vector based on the web browsing history of the web user.

14. The system of claim 13, wherein the operations further comprise generating, by the processor, a modified topic frequency vector based on the plurality of links obtained for the each internet topic.

* * * * *